United States Patent [19]
Royal

[11] 3,886,555
[45] May 27, 1975

[54] RADIATING TARGET DIRECTION FINDING SYSTEM

[75] Inventor: Douglas E. Royal, Palos Verdes Estates, Calif.

[73] Assignee: TRW Inc., Redondo Beach, Calif.

[22] Filed: June 4, 1973

[21] Appl. No.: 366,782

[52] U.S. Cl. ............ 343/117; 343/113; 343/118; 343/123; 343/7.4
[51] Int. Cl. .................... G01s 5/02; G01s 5/04
[58] Field of Search ......... 343/7.4, 113, 117, 118, 343/763, 766, 758, 895, 123

[56] References Cited
UNITED STATES PATENTS

| | | | |
|---|---|---|---|
| 2,509,207 | 5/1950 | Busignies | 343/123 |
| 2,608,683 | 8/1952 | Blewett | 343/123 |
| 2,784,400 | 3/1957 | Ehrenfried | 343/7.4 |
| 3,206,753 | 9/1965 | McCoy | 343/7.4 |
| 3,713,163 | 1/1973 | Keller et al. | 343/895 |
| 3,760,420 | 9/1973 | Hadad et al. | 343/117 R |

Primary Examiner—Maynard R. Wilbur
Assistant Examiner—T. M. Blum
Attorney, Agent, or Firm—Daniel T. Anderson, Esq.; Edwin A. Oser, Esq.; Jerry A. Dinardo

[57] ABSTRACT

A direction finding system for a target radiating a wave such as an electromagnetic or sound wave. The system employs a rotating sensor such as one or a pair of antennas responsive to the radiating wave. When the sensor rotates there will be an output signal obtained at a number of points during a revolution.

This output signal is indicative of elevation and azimuth angles to the target. The output signal may represent a phase difference which can now be converted into an error signal by comparing it with the particular position of the antenna. This makes it possible to generate azimuth and elevation error voltages. These may either be used to indicate the direction to the target or else they may be used for pointing the rotation axis of the sensor through a gimbal system toward the target. It is also feasible to have two rotating, strapped down antennas which cannot be made to point to the target but which can generate the error signal from which elevation and azimuth signals may be derived. Finally, it is possible to rotate a single antenna about a spin axis forming an angle with the principal axis of the antenna. This also permits to derive an amplitude-modulated signal from which the azimuth and elevation error signals may be obtained.

18 Claims, 9 Drawing Figures

3,886,555

RADIATING TARGET DIRECTION FINDING SYSTEM

BACKGROUND OF THE INVENTION

This invention relates generally to a direction finding system for a target radiating a wave, and particularly relates to apparatus which may be pointed toward the target or from which the azimuth and elevation directions to the target may be derived.

Direction finding systems are well known in the art. Examples of such prior art systems are applicant's prior U.S. Pat. Nos. 3,246,331 and 3,392,391 assigned to the same assignee as is the present application. In the past it has been necessary to use highly calibrated equipment for finding the direction to a radiating target. The purpose of the calibration is to remove phase errors which may be due, for example, to variations in response of the phase measuring circuits with time or with signal frequency or signal amplitude. Furthermore, it is necessary to have precisely matched antennas. The difficulties experienced in the past with the precise calibration of somewhat complex equipment have limited the accuracy obtainable to the order to a degree of arc.

Furthermore, conventional direction finders have a limited bandwidth. This is primarily due to the fact that it is very difficult to calibrate the equipment including a sensor such as an antenna or a pair of antennas for a wide frequency range and for a wide range of directional angles.

It is accordingly an object of the present invention to provide a direction finding system for a target radiating a wave which does not require any calibration before it can be used.

A further object of the present invention is to provide a direction finding system of the type discussed which permits to measure the spatial angles such as elevation and azimuth angles to the target with an accuracy on the order of a magnitude greater than that obtainable with prior art systems.

Another object of the present invention is to provide a direction finding system which combines greater accuracy with broad-band performance characteristics.

SUMMARY OF THE INVENTION

In accordance with the present invention there is provided apparatus for determining a direction from a platform to a target radiating a wave. This may, for example, be the elevation and azimuth angle from the platform to the target.

The wave radiated by the target may, for example, be an electromagnetic wave such as a wave in the radio-frequency spectrum or in the microwave region. Alternatively, the target also may radiate a sound wave.

Detector means are provided for detecting the radiated wave. This may consist, for example, of a single antenna or a pair of antennas. The two antennas are rotated about a predetermined axis. The same is true of a single antenna in which case the rotation axis or spin axis should make an angle with the principal axis of the antenna. From the detector means there is derived a modulated signal. This may be an amplitude-modulated wave obtained from a single antenna or a phase-modulated wave derived from a pair of antennas. The modulation will be equal at two opposite points during each cycle of rotation only when the axis of rotation points in the direction of the target.

The spin axis may now be pointed toward the target by utilizing an error signal derived from the phase or amplitude modulation. Once the spin axis is pointed toward the target the fundamental component of the modulation will vanish.

Alternatively it may not be necessary or desired to adjust the orientation of the spin axis to direct it toward the target, that is it may not be necessary to provide an electro-magnetic pointer. In this case the rotating antenna may be considered to be strapped down and the error signal may be processed to obtain the azimuth and elevation angles.

The novel features that are considered characteristic of this invention are set forth with particularlity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENTS

General Principles of an Electromagnetic Pointer

Figure 4:
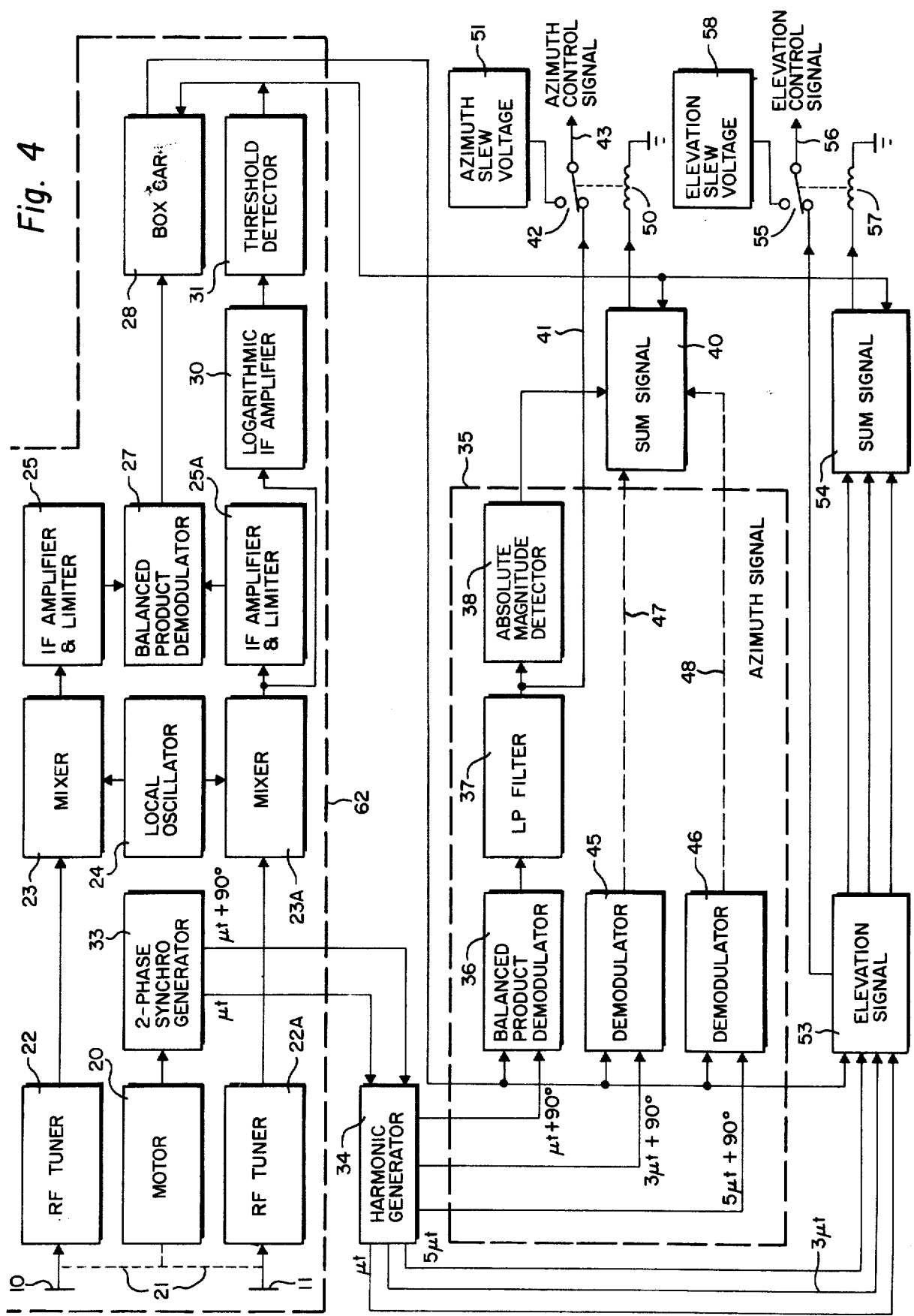
FIG. 4 is a block diagram illustrating the electronics for deriving azimuth and elevation control signals which may be used for pointing the rotation axis of a pair of rotating antennas toward the target, the transmitted wave being assumed to be a pulse microwave such as used for radar.
Figure 5:
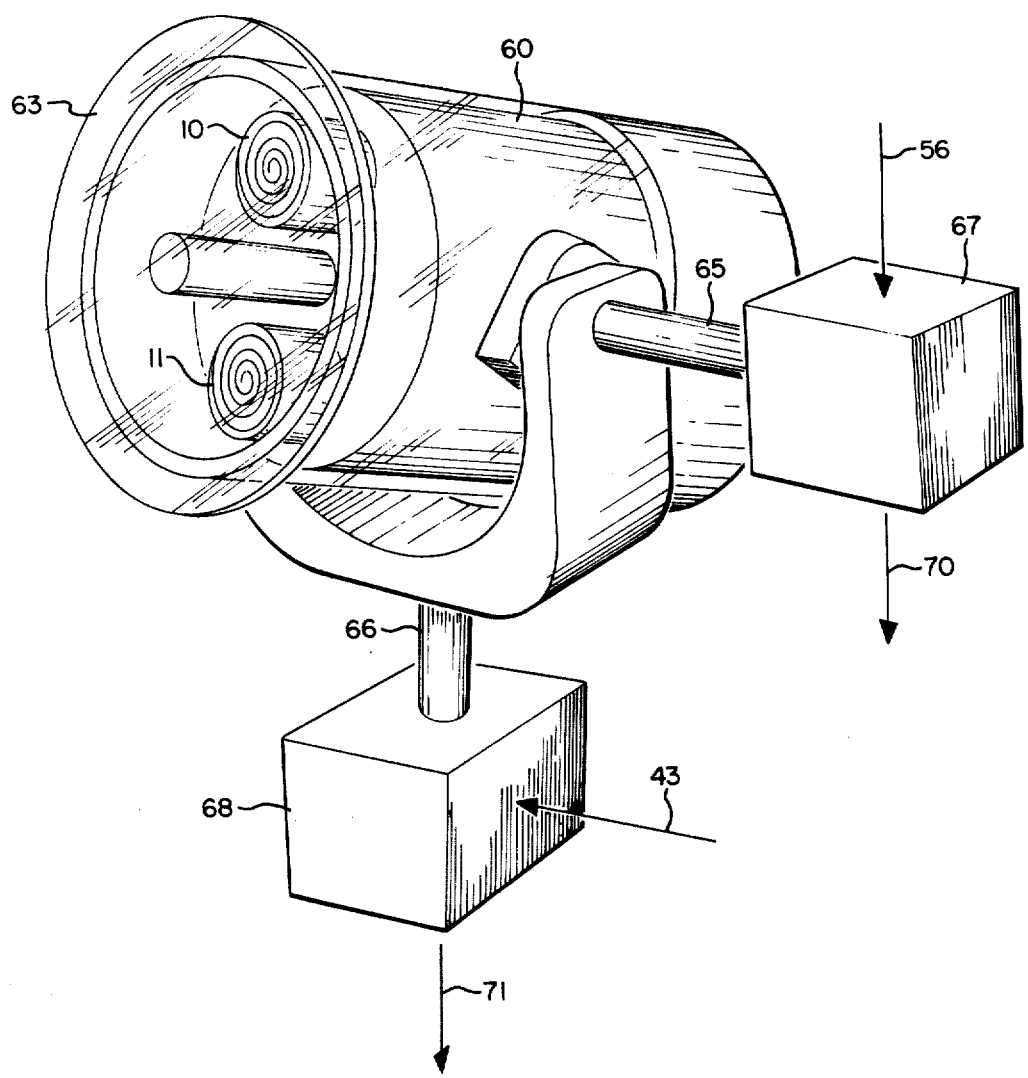
FIG. 5 is a view in perspective of a gimbaled rotating antenna system and including controlled means for pointing the rotation axis in the direction of the target and for encoding the corresponding gimbaled shaft positions to derive azimuth and elevation angles.

Before describing the first embodiment of the invention which is illustrated in FIGS. 4 and 5 it will be convenient at this point to explain the principles on which the present invention are based. Thus, the direction finding system of the invention measures two space angles which determine the direction from the platform on which the system is mounted to a target to which the sensor is tuned. The measurement is made in such a manner as to eliminate bias errors of the equipment which in prior art devices have limited the accuracy of the direction finder. The accuracy of the direction finder of the invention is limited basically by the thermal noise, that is by the signal-to-thermal-noise ratio.

Figures 1A, 1B:
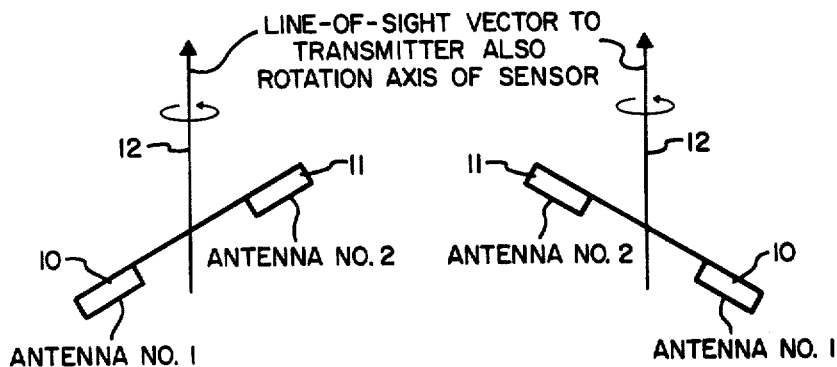
FIGS. 1A and 1B are schematic representations of two rotating antennas having their rotation axis pointing toward a target for explaining the principles of operation of the invention.

In order to understand the principles of the invention reference is now made to FIGS. 1A and 1B. As shown here there is a first antenna 10 and a second antenna 11 both arranged to rotate about an axis 12. As shown in FIGS. 1A and 1B the axis 12 is both the spin axis and the line-of-sight vector to the target. The antennas 10 and 11 should be so arranged that they can receive the transmitted wave. Preferably, but not necessarily, the two antennas 10 and 11 are circularly polarized and may, for example, assume the form disclosed in FIGS. 1 and 2 of the applicant's prior U.S. Pat. No. 3,246,331 above referred to.

In the orientation shown in FIG. 1A the signal which is assumed to be a single arriving wave from a distant transmitter excites a phase advance at antenna 11 with respect to antenna 10. Therefore, it may be assumed that the electronic equipment conventionally connected to the antennas produces an output signal $\phi_1$. Assume now that the two antennas are rotated through 180° as shown in FIG. 1B. In this orientation the signal from the target or transmitter creates the same phase advance in antenna 11 measured with respect to antenna 10.

As a result an output signal $\phi_2$ is identical to the previous output signal $\phi_1$, that is, $\phi_1 = \phi_2$.

This situation prevails when the rotation axis of the sensor coincides with the line-of-sight vector to the transmitter or target. It will also be obvious that this is true of any rotational orientation of antenna 11 with respect to antenna 10 in the arrangement shown in FIGS. 1A and 1B. In other words the phase angles measured at opposite points of rotation will always be equal.

Figures 2A, 2B:
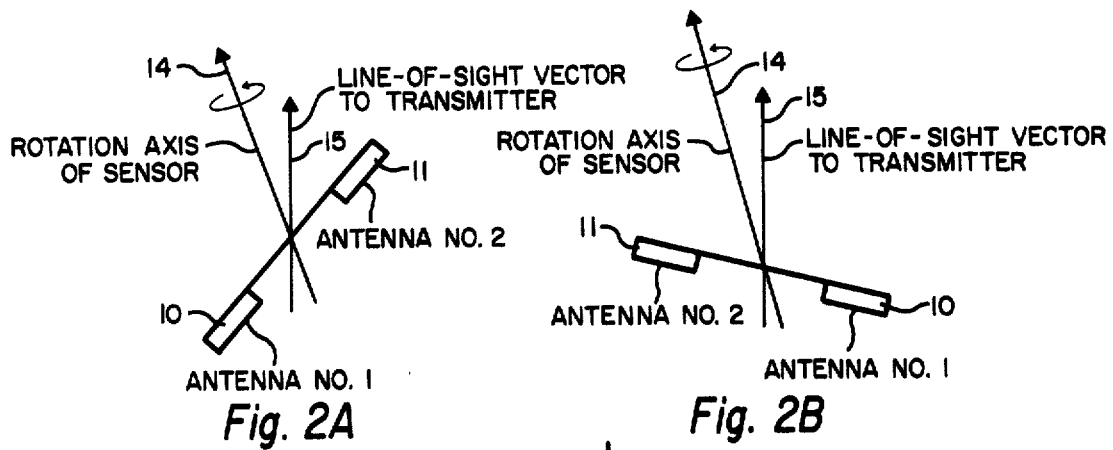
FIGS. 2A and 2B are schematic representations of two rotating antennas similar to those of FIGS. 1A and 1B but illustrating an angle between the axis of rotation and the line of sight vector to the target.

FIG. 2A shows the situation where the spin axis 14 no longer coincides with the line-of-sight vector 15 to the transmitter. In the orientation of FIG. 2A a phase angle $\phi_3$ is measured. This phase angle does not equal the phase angle $\phi_4$ obtained in the orientation of FIG. 2B displaced through a rotation angle of 180°.

Accordingly, in accordance with the present invention the antennas may be adjusted until the rotation axis 14 coincides with the line-of-sight vector 15. This may be effected simply by adjusting the direction toward which the rotation axis points until for two opposite points during a cycle of rotation the phase angles become equal or the difference of the two phase angles vanishes. Alternatively, in accordance with the present invention the modulation of the phase angle which is a function of the rotation of the antenna system may be utilized to determine the space angle toward the target. How this may be effected will be described more in detail hereinafter. Basically, however, the magnitude and sense of the modulation are used either to drive a servomechanism or to derive the ultimate space angle.

It will be realized that FIGS. 1A, 1B and FIGS. 2A, 2B depict a two-dimensional situation. Actually, it will be realized that a three-dimensional picture would be necessary. However, the results remain the same which may be readily realized by examining events occurring in a plane at right angles to the paper plane.

To summarize once again, the output of a phase detector coupled to the two rotating antennas contains no fundamental component of the rotation rate only for the condition that the rotation axis 14 and the line-of-sight vector 15 coincide.

Figure 3:
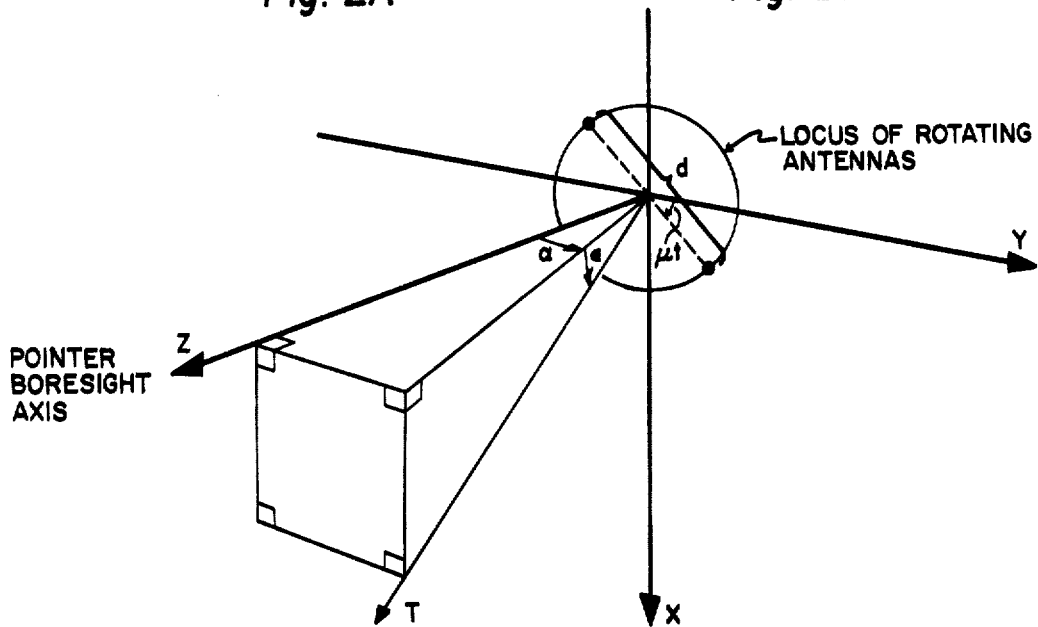
FIG. 3 is a geometric construction to illustrate various geometric relationships between the sensor and the target.

Referring now to FIG. 3 there is shown the geometry between a target T and the origin of a coordinate system XYZ which may be considered to be the origin of the sensor system. The target T generates an excitation in the XY plane, that is in the antenna plane, such that the phase advance of antenna 11 with respect to antenna 10 is:

$$\phi_{(t)} = \beta_o \sqrt{1 - \cos^2 \alpha \cos^2 \epsilon} \sin [\mu t + \tan^{-1} (\sin \alpha \cot \epsilon)]$$

(1)

In this formula $\beta_o = 2\pi d/\lambda$, where $\lambda$ is the wavelength of the radiated signal, $t$ is time and $d$, $\alpha$ and $\epsilon$ are shown in FIG. 3. The angles $\alpha$ and $\epsilon$ give the directions to the target T referred to the axis of rotation. It will now be assumed that the antennas rotate about the Z axis at an angular rate $\mu$.

In general the two channels corresponding to antennas 10 and 11 have a phase offset $\phi_c$. Therefore, the phase difference of the signals presented to a balanced product demodulator will be $\phi_{(t)} + \phi_c$. The output $E_o$ of the demodulator may be described in a Bessel function expansion as follows:

$$E_o = KE_1 \cos \phi_c [J_o (r) + 2 J_2 (r) \cos 2s + 2 J_4 (r) \cos 4s + \ldots ] -2KE_1 \sin\phi_c [J_1 (r) \sin s + J_3 (r) \sin 3s + J_5 (r) \sin 5s + \ldots ]$$

(2)

In this formula $J(r)$ are the Bessel functions. $E_1$ represents the magnitude of the received signal and K is a constant of proportionality. Also $$r = \beta_o \sqrt{1 - \cos^2 \alpha \cos^2 \epsilon}$$

and $s = \mu t + [\tan^{-1} (\sin \alpha \cot \epsilon)]$. The importance of Formula (2) will subsequently be discussed.

When the antennas are locked on the target, that is when the rotation axis 14 coincides with the line-of-sight vector 15 $\alpha$ and $\epsilon$ both equal 0. Accordingly $$E_o = KE_1 \cos \phi_c$$

(3)

This is so because $J_o (0) = 1$ and $J_n (0) = 0$ when $n$ is not equal to 0.

Having described the general principles of the invention, the first specific embodiment will now be explained in detail.

A Gimbaled Electromagnetic Pointer for Pulsed Microwave Transmitters

A particular embodiment of the present invention will be described by reference to FIGS. 4 and 5. This embodiment provides a gimbaled pointer which may be provided with servomechanism drives to the two gimbal shafts. Furthermore, each shaft may be provided with a conventional shaft encoder for reading or detecting the orientation of each shaft and thereby the space angles to the target. The system further comprises a direction finding sensor subsystem which provides the output or error signals for orienting the gimbal shafts.

The direction finding sensor subsystem is illustrated in FIG. 4 while FIG. 5 shows the gimbal subsystem. The embodiment of the invention of FIGS. 4 and 5 is specifically designed for finding the direction to a pulsed microwave transmitter. This may, for example, consist of a radar transmitter emitting periodic pulses. If the transmitter or target is not pulsed it will be understood that some of the equipment included in the block diagram of FIG. 4 may be omitted.

As shown particularly in FIG. 5 the electromagnetic pointer again includes two antennas 10 and 11 which preferably are circularly polarized antennas of the type disclosed in applicant's prior patent previously referred to. However, if the incident wave is linearly polarized, or more generally if the antennas and/or the received field are elliptically polarized, it is possible that a second and other even order harmonics corresponding to the rotation of the antenna may be generated but these harmonics can readily be filtered out.

Accordingly, the two antennas 10 and 11 are rotated by a motor 20 through a linkage shown by dotted lines 21 about a common axis. While FIGS. 4 and 5 indicate that the antennas are rotated about an axis extending through a point between the antennas this is not necessary. It is even feasible to rotate the antennas through an axis extending through a point outside of the antennas. Such a rotating pair of antennas simulates a rotatable interferometer with a predetermined aperture.

The motor 20 may rotate the antennas at rates say between 30 rpm and 1,200 rpm. All that is necessary for the sensor subsystem is that it possess short term stability. This simply means that any measurement made at a given point of rotation of the antenna must be compared to a measurement made at one half of its rotation period later in time. As long as these two measurements can be reliably compared with each other sufficient short time stability is provided.

For each of the two antennas 10 and 11 there is provided a separate channel for amplifying and heterodyning the received signal. Antenna 10 is followed by a radar frequency tuner 22 which in turn is followed by a mixer 23 connected to a local oscillator 24. The mixer in turn is followed by an intermediate-frequency amplifier and amplitude limiter 25. The antenna 11 is provided with a similar channel identified by the same reference numbers followed by a capital letter A such as RF tuner 22 A.

The outputs of the two IF amplifiers 25 and 25a feed a balanced product demodulator 27. Such a balanced product demodulator demodulates, for example, a phase-modulated carrier to yield the modulation signal. Considered another way, it generates the integral over a predetermined length of time of the product of the two input signals as a function of time. The output of the demodulator 27 may have to be suitably filtered.

The output of the balanced product demodulator 27 is passed through a box car circuit 28 which is essentially a sample and hold circuit. Thus the box car circuit stretches the video signal which is impressed on the circuit. Such circuits are conventionally used in radar for sampling a voltage waveform and storing the latest signal value received. It will, of course, be understood that if the transmitter or target continuously radiates, there is no need to use the box car circuit.

In order to make sure that the transmitter is actually transmitting some additional equipment is desirable. For example, the mixer 23A may be followed by a logarithmic IF amplifier 30 and a threshold detector 31. This will generate an output signal as long as the input signal exceeds a preset threshold which is usually set sufficiently high above the noise level to make sure a usable signal level is received. The output signal from the threshold detector 31 may be impressed on the box car 28 to make sure that the box car input signal is only sampled if it exceeds the preset threshold value.

The balanced product demodulator 27 in the present case may be considered simply to be a phase detector which detects the difference in phase between the two waves obtained from amplifiers 25 and 25a. This, of course, corresponds to the phase difference of a received wave at the two antennas and is indicative of the direction from which the wave originates. This phase information must now be correlated with the actual position of the two antennas 10 and 11 during their cycle of rotation. This may, for example, be accomplished by the provision of a two-phase synchrogenerator 33 which may be coupled to the motor 20. The synchrogenerator 33 may be arranged to generate two output waves cos $\mu t$ and cos $(\mu t + 90°)$ having phases which are 90° apart. These two waves may be passed through harmonic generators 34 of any conventional type to generate the third and the fifth harmonics of the two input waves. Accordingly, six output waves are obtained as follows:

$$\cos \mu t, \cos 3\mu t, \cos 5\mu t \text{ and } \cos (\mu t + 90°), \cos (3 \mu t + 90°) \cos (5\mu + 90°)$$

(4)

As will be subsequently explained the six sinusoidal waves shown at (4) related to the position of the antennas are now correlated with the output signal from the box car circuit 28. This in turn will eventually yield the elevation and azimuth error signals. However, before explaining the remainder of the circuit diagram of FIG. 4 it will now be convenient to explain why it is necessary to utilize odd harmonics of the two waves generated by the synchrogenerator 33. The reason for this is formula (2). If use is made of only the fundamental oscillatory component in the expansion of formula (2) ambiguities may exist if $J_1(r) = 0$ where $r$ is not 0. However, this does not necessarily mean that the sine term preceding the bracket of equation (2) vanishes. The reason is that the $J_3(r)$ term and higher odd Bessel terms are not necessarily 0 for the above condition. Therefore, to assure that the sine term of equation (2) vanishes so that $E_o$ is given by equation (3) it is necessary to also investigate one or more harmonics of odd order such as the third and fifth.

Accordingly, for the azimuth signal shown in dotted box 35 it is desirable to provide three separate channels. One of these channels requires another balanced product demodulator 36 into which the output signal of box car circuit 28 is fed as well as the signal cos $(\mu t + 90°)$.

The demodulator 36 may be followed by a low pass filter 37 and an absolute magnitude detector 38 which provides one of the inputs to a sum signal circuit 40. The actual azimuth control signal is obtained from low pass filter 37 and appears on lead 41 from where it may be switched through switch contact 42 onto output terminal 43.

Two additional demodulators indicated at 45 and 46 provide the other two channels of the azimuth signal 35. Each demodulator 45, 46 may include a low-pass filter such as 37 and an absolute magnitude detector such as 38. Each of the two demodulators is again fed with the output signal from box car circuit 28. The respective third and fifth harmonic of the synchro signal are also respectively applied to the two demodulators.

The outputs of the two demodulators 45 and 46 are obtained from output leads 47 and 48 respectively and are also applied to the sum signal circuit 40 as is the output of threshold detector 31.

The purpose of the sum signal circuit 40 is to make sure that the sine term of equation (2) actually vanishes to indicate lock-on. In this case the inductor 50 is energized by the output of the sum signal circuit 40 to connect the switch contact 42 to the azimuth control signal terminal 43.

When it is desired to search or track for a target the switch contact 42 may be connected to the azimuth slew voltage generator 51 which will cause the antenna to go through a searching phase until lock-on has been accomplished.

Once lock-on has been accomplished the azimuth control signal is obtained from terminal 43 and is directly derived from the low-pass filter 37.

The elevation signal generator 53 operates in the same manner as does the azimuth signal generator 35 previously explained. The only difference is that the reference sinusoidal waves are now $\cos \mu t$ and its third and fifth harmonic. The sum signal circuit 54 again serves the same purpose to pull the switch contact 55 into contact with the elevation control signal terminal 56 upon lock-on. This is again controlled by an inductor 57 connected to the output of sum signal circuit 54. Before lock-on the elevation slew voltage may be impressed on the elevation control signal terminal 56 through the slew voltage generator 58.

To emphasize again the balanced product demodulators such as 36, 45 and 46 operate as cross correlators to cross correlate the output of the box car circuit 28 with the signals obtained from the synchrogenerator which are a measure of the instantaneous positions of antennas 10 and 11 during each cycle of rotation.

Referring now particularly to FIG. 5, it will be appreciated that some or all of the equipment shown in FIG. 4 may be contained in the housing 60 which houses the motor 20 and the antennas 10 and 11. By way of example, the housing 60 may contain the equipment contained in dotted box 62 of FIG. 4 including box car circuit 28 and threshold detector 31.

It will be understood that power may be applied to the equipment in the housing 60 through suitable slip rings and that the output signals may be derived in the same fashion.

As clearly shown in FIG. 5 the antennas 10 and 11 may be covered by a radome 63. It will also be understood that the radome 63 forms part of the overall direction finder sensor subsystem and rotates with it. Therefore, whatever error the radome produces simply adds to the other errors of the system. There is no need to correct for these errors. All that is necessary is to adjust the gimbal system of FIG. 5 until the phase difference as measured by the balanced product demodulator 27 contains no fundamental component or odd harmonic of the rotation rate.

The housing 60 is mounted on a horizontal shaft 65 which permits to adjust the antennas in the elevation direction. Similarly, the system is mounted on a vertical shaft 66 which permits adjustment of the azimuth direction. The elevation control signal obtained from output lead 56 may be impressed on a servo system shown schematically at 67 for rotating the shaft 65 and thereby the antennas into the desired elevation direction.

Similarly, the azimuth control signal obtained from lead 43 may be impressed on a servomechanism 68 coupled to the vertical shaft 66 for adjusting the antenna system in the azimuth direction. The actual angular positions of the two shafts 65 and 66 may be obtained from conventional shaft encoders included in the boxes 67, 68 and which translate the positions of the shafts into some suitable output signals such as digital output signals. Accordingly, from output leads 70 and 71 the elevation and azimuth directions of the finally adjusted gimbaled subsystem may be obtained.

It will be understood that if the target transmits continuously logarithmic amplifier 30 and threshold detector 31 may be omitted.

Thus it will be appreciated that the elevation and azimuth angles of the antennas 10 and 11 are adjusted until the phase difference of the signals in the two channels or the difference of the phases obtained from amplifiers 25, 25a no longer contains the fundamental or odd harmonics of the rotation rate. Then the rotation axis of the antennas points in the direction of the target. In this case the spin axis of the two antennas 10 and 11 coincides with the line-of-sight vector to the transmitter or target. Before this adjustment is made the output of the phase detector 27 contains a modulation component having a magnitude and sense which is used as the input signal to the servomechanisms that is they form the azimuth and elevation control signals.

It is to be understood that it is not necessary to rotate the antennas 10 and 11 by a motor such as shown at 20 in FIG. 4. In other words it is not necessary to rotate the antennas at a constant rate. However, if the antennas are rotated in some manner such as by a motor at a constant rate then the phase difference obtained from a phase detector such as shown at 27 will have at most only a constant value and even order harmonics of the rotation rate when the axis of rotation of the antenna points at the target. Under these conditions all odd harmonics of the modulation will also vanish as well as the fundamental. In this connection it should be pointed out that the phase detector measures the phase differences of the two waves received by the two antennas.

Assume now that the two antennas are rotated at a rate which is not constant. For example, it is feasible to rotate the antennas by hand to obtain readings of two opposite points in a cycle of rotation. In that case only the differences of the phase differences of the two waves will vanish at pairs of opposite points. This procedure may be repeated for many pairs of points, each pair being taken at opposite points, that is at two points 180° apart during a cycle of rotation. In case the antennas are not rotated at a constant rate one cannot really talk of harmonics of the fundamental of the modulation component.

It will also be understood that the electromagnetic pointer of the invention can be designed for bandwidths covering more than an octave. This is due to the fact that the error in the system is inherently cancelled.

As indicated above, the electromagnetic pointer of the invention provides both target lock-on as well as target acquisition. It should be noted that the pointer of the invention can provide angular information on a multiplicity of different targets during a common time interval. However, this type of information is of reduced accuracy. The full accuracy of the pointer is achieved only on a specific target to which it is locked. However, since target acquisition and subsequent lock-on are conventionally practiced in the radar art, a full description has not been given herein.

In summary, it might be said that the electromagnetic pointer of the invention behaves somewhat like an ideal interferometer. The main source of error is due to thermal noise produced by the collection and processing equipment. On this basis the probable error of the final output signal may be readily determined. The embodiment of the invention of FIGS. 4 and 5 may provide an accuracy with an error of less than 2 milliradians.

A Strapped-Down Direction Finder

The direction finder described in connection with FIGS. 4 and 5 is provided with a gimbaled antenna system. This permits to point the rotation axis of the antennas in the direction of the target. However, in some cases it may not be necessary or even desirable to provide a gimbaled pointer.

For some platforms such as an airplane a gimbaled system may not be convenient. Therefore, the strapped-down direction finder which will now be explained in connection with FIG. 6 has certain advantages over the embodiment of the invention of FIGS. 4 and 5. For example, it provides a faster response time because it is no longer necessary to physically orient the rotating antennas with their housing. On the other hand its angular accuracy depends on the accuracy of the frequency determination of the radiating wave which is not the case in the gimbaled system.

Figure 6:
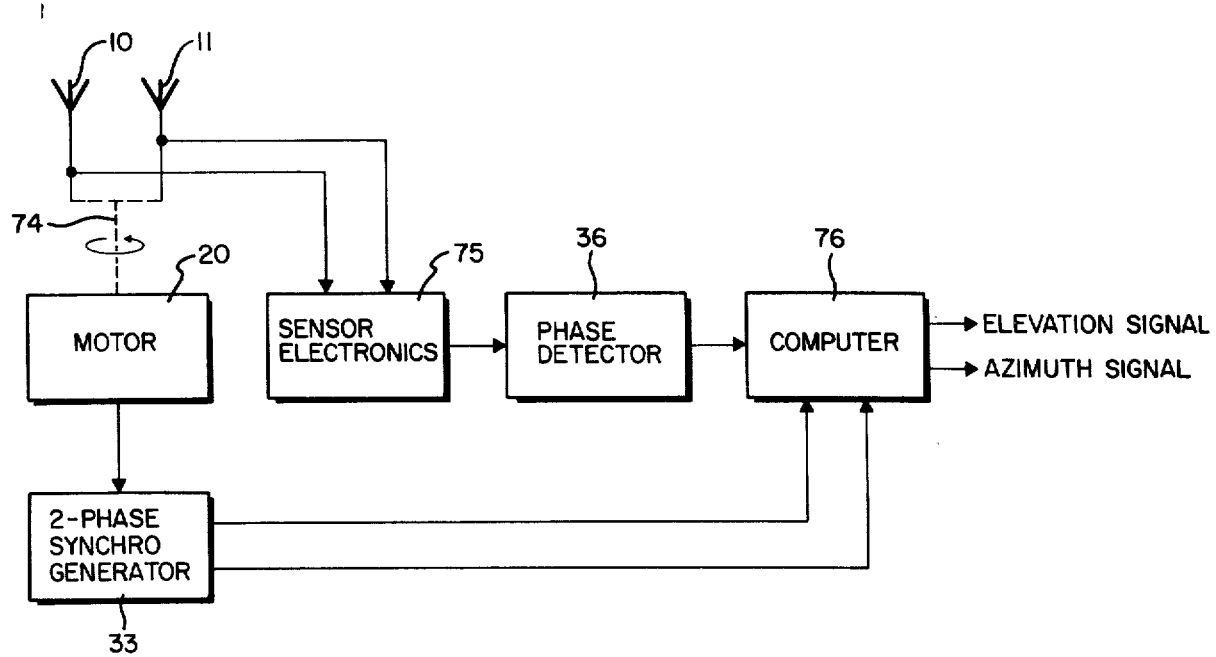
FIG. 6 is a schematic representation in block diagram form of a strapped-down direction finder including means for deriving the elevation and azimuth signals.

It should be noted that the strapped-down embodiment of the invention of FIG. 6 does not necessarily require a motor for rotating the antennas. Thus the entire platform may be made to rotate which is usually the case for a spinning projectile, shell or the like. In this case an air platform rotates at a predetermined speed and no special motor is required.

Referring now to FIG. 6 there is again illustrated an interferometer consisting of two antennas 10 and 11 which may, for example, be rotated about an axis 74 by the motor 20. However, as just explained the use of the motor 20 may be obviated in case the entire platform rotates. The axis of rotation 74 may, for example, be aligned with the longitudinal axis of the aircraft but this is not necessary.

There may again be provided a two-phase synchro-generator 33 for generating the two sinusoidal waves displaced from each other by 90° in phase for correlating the output of the system with the rotational position of the antennas. The generator 33 is preferably coupled to the motor 20.

The two antennas 10 and 11 are each connected to a separate channel shown in FIG. 6 as sensor electronics 75. This may, for example, consist of the RF tuner 22, mixer 23, local oscillator 24 and IF amplifier and limiter 25 and the corresponding equipment for the second channel. The phase detector 36 may be identical with the balanced product demodulator 36 of the block diagram of FIG. 4.

In case the transmitter is a radar transmitter which transmits only for short periods of time, it may again be necessary to provide a box car circuit 28 as well as a threshold detector 31 and a logarithmic amplifier 30 in associated equipment.

At points diametrically apart in the rotation cycle, the component of phase difference due to antenna-to-transmitter path length difference changes sign but the component due to differential phase shift in the two channels of the sensor does not change sign. Therefore, the difference of the phase detector outputs at points 180° apart in the rotation cycle is free of the internal sensor unbalance and is twice the value of the phase shift due to the path length difference corresponding to that rotation angle.

From this principle the elevation signal and azimuth signal may be calculated by an analog computer 76 from an input signal obtained from the phase detector 36 and from the two sinusoidal waves developed by synchro generator 33. This may be effected in a conventional manner by an analog computer which is essentially a servo system.

The analog computer may, for example, include a resolver driven by a servo motor which receives control signals from the phase detector 36. When the phase detector has a zero output the resolver shaft position will be proportional to the net differential phase shift between the two channels. Basically, it can be shown that one can obtain signals proportional to $\beta_o \sin \alpha \cos \epsilon$ and to $\beta_o \sin \epsilon$ from a shaft encoder on the resolver shaft when the interferometer axis of the sensor is in the azimuth plane and in the elevation plane, respectively.

An additional servo driven resolver can provide the angle $\epsilon$ from its shaft position when fed by the signal $\beta_o \sin \epsilon$. Then by using an output signal $\beta_o \cos \epsilon$ from this resolver and the signal $\beta_o \sin \alpha \cos \epsilon$, a third servo driven resolver provides a signal proportional to $\sin \alpha$ and this signal can be processed in a fourth servo driven resolver to yield the angle $\alpha$. However, as indicated before, such analog computers including servo systems having a motor and a resolver are well known in the art and therefore a further explanation is not believed to be necessary. It will also be appreciated that a digital computer may be used in place of the above described analog computer means.

The elevation and azimuth signals obtained in the manner just described may be used to activate suitable indicators, for example, by means of synchro transmitters and receivers. This equipment will then display the desired azimuth and elevation angles.

It should be noted that for the embodiment of the invention of FIG. 6 it is desirable to hold the mutual coupling between antennas 10 and 11 to a minimum in order to improve the accuracy because the effects of mutual coupling between channels are not canceled in this embodiment. Furthermore, it is desirable to use a phase detector 36 which is as linear as possible or whose input-output relationship is very precisely known to maintain a high accuracy. Neither of these two features is necessary for the gimbaled electromagnetic pointer of FIGS. 4 and 5.

A Single Channel Sensor

The direction finding system of the present invention is not restricted to a pair of rotating antennas which provide a phase interferometer. What can be used is a sensor system having a fixed geometry and which develops a signal modulated due to the fact that it is rotated about a spin axis and whose signal modulation is proportional in magnitude to the magnitude of the angular deviation of the spin axis from the line-of-sight vector to the target. Furthermore, the phase of the amplitude modulation correlated to the spin rate has a unique or one-to-one correspondence with the direction of the angular deviation between spin axis and lineof-sight vector. In other words the amplitude modulation varies over a cycle of rotation of the antenna.

Figure 7:
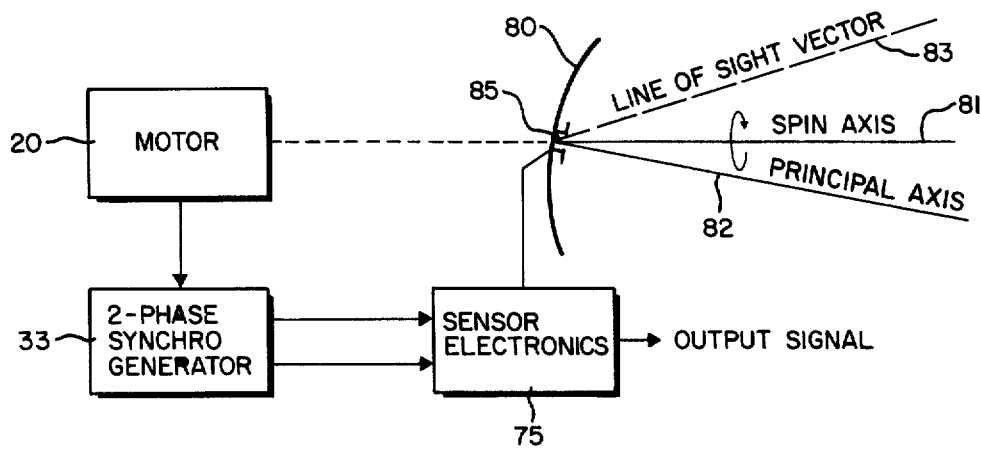
FIG. 7 is a schematic representation of a single channel sensor and associated electronics for deriving the desired elevation and azimuth angles.

Such an embodiment of the invention is illustrated in FIG. 7. The embodiment of FIG. 7 includes an antenna 80 which may, for example, be a parabolic reflector as shown and which is rotated by a motor 20 about a spin axis 81. The spin axis 81 forms an angle with the principal axis 82 of the antenna. The line-of-sight vector is shown at 83. This is the vector to the target.

It should be noted that in the embodiment of FIG. 7 of the present invention the entire antenna 80 including both the reflector and the feed 85 are rotated in unison. Furthermore, as indicated the spin axis is offset from the principal axis.

It will be realized that such a configuration resembles somewhat that used in a conical scan radar system. However, there is a significant difference between the sensor of a conical scan radar system and the sensor of FIG. 7. In a conical scan radar system the scanning feed of the antenna which may be equipped with a secondary reflector is nutated about the principal axis of the reflector. This principal axis is moved by a servomechanism to coincide with the line-of-sight vector to the target whereupon in principle, the error vanishes.

As pointed out before in the sensor of the present invention the entire antenna rotates in unison, that is both reflector and feed are rigidly affixed to one another and rotate together. This also applies to a single aperture antenna such as a horn antenna. Additionally, as explained before the principal axis of the antenna is offset from the spin axis. The modulation of the signal produced by the rotation of the antenna vanishes when the spin axis 81 and the line-of-sight vector 83 coincide. This modulation is the error signal which drives the servomechanism to point the antenna. This may be effected as previously illustrated in connection with FIG. 5. An important feature of the present invention is that this modulation vanishes regardless of imperfections of the antenna construction.

This is not the case in a conical scan radar system. The degree to which the modulation vanishes when the modulation axis coincides with the line-of-sight vector directly depends upon the accuracy of construction of the primary and secondary antenna structures.

The reason that in the direction finding system of the invention the modulation will vanish in spite of imperfections of the antenna is the fact that the attitude of the antenna with respect to the target does not vary when the line-of-sight vector and the spin axis coincide. This is not true in the case of the conical scan radar antenna.

The additional advantage of the direction finding system of the invention is the greater bandwidth which can be obtained with the system of the invention. The bandwidth may cover at least an octave which is of great advantage in a reconnaissance system or in certain frequency agile radar systems.

There is again provided a two-phase synchro generator 33 which may be driven by the motor 20. There is further provided sensor electronics 75 which may generally be similar to that previously explained in connection with FIGS. 4 and 6. It will be understood however that the sensor electronics now has only a single channel because there is only a single antenna. It will also be understood that the modulation signal will be amplitude modulated so that the phase detector is replaced by an amplitude detector and it will be preceded by a non-limiting IF amplifier. Otherwise, the sensor electronics may resemble that shown in FIG. 4 to derive an azimuth and elevation control signal which may then be used to operate a servomechanism as shown in FIG. 5 to position the antenna until the spin axis 81 and the line-of-sight vector 83 coincide. The actual azimuth and elevation angles may be obtained from suitable shaft encoders as previously described.

There has thus been disclosed a direction finding system for a target radiating a wave. The direction finding system includes a sensor which may consist of two antennas rotated about an axis. The antennas may be mounted on a gimbaled platform so they can be pointed toward the target. The antenna is pointed toward the target when the modulation contains no fundamental or odd harmonics of the rotation rate. The system of the invention makes use of the fact that at opposite points of the cycle of rotation the modulation signal becomes equal or the difference vanishes. This is so regardless of imperfections of the antenna or transmission lines or errors caused by unbalances in the channels of the sensor. Alternatively, the spin axis of the antennas may be strapped-down in which case an output signal is derived indicative of the elevation and azimuth angles to the target. According to another version of the invention a single antenna is rotated about a spin axis offset from the principal axis of the antenna. In all cases a signal is derived from the sensor system which is modulated. In case the entire platform rotates, there is no need to rotate the antenna with respect to the platform. The system is characterized by greater accuracy which is at least an order of magnitude larger than that of conventional systems and provides a bandwidth of at least an octave.

What is claimed is:

1. The method of determining a direction from a platform to a target radiating a wave by means of a direction sensitive detector of the radiated wave including an antenna assembly, said method comprising the steps of:
   a. rotating the detector and the antenna assembly about a predetermined axis of rotation; and
   b. comparing, in synchronism with the rotation of the detector and the antenna assembly, to one another the output signals obtained at a plurality of pairs of points diametrically opposite to each other with respect to the axis of rotation to develop a set of difference signals, thereby to provide an error signal from which the direction from the platform to the target may be obtained.

2. The method defined in claim 1 which includes the additional step of altering the direction of the axis of rotation until the difference signals vanish throughout a cycle of rotation of the detector, whereupon the axis of rotation coincides with the line-of-sight to the target.

3. The method defined in claim 2 which includes the further step of deriving the direction of the axis of rotation when the axis of rotation coincides with the line-of-sight to the target.

4. The method of determining a direction from a platform to a target radiating a wave by means of a direction sensitive detector of the radiated wave, including an antenna assembly, said method comprising the steps of:
   a. continuously rotating at a uniform rate the detector and the antenna assembly about a predetermined axis of rotation to derive a modulated output signal;

b. comparing, in synchronism with the rotation of the detector and the antenna assembly, the modulation of the output signal to the rotation rate of the detector, thereby to develop an error signal from which the direction from the platform to the target may be obtained; and c. altering the direction of the axis of rotation until the fundamental and odd harmonics of the modulation of the output signal vanish whereupon the axis of rotation coincides with the line of sight to the target.

5. The method defined in claim 4 which includes the further step of deriving the direction of the axis of rotation when the axis of rotation coincides with the line of sight to the target.

6. Apparatus for determining a direction from a platform to a target radiating a wave, said apparatus comprising:
   a. detector means for detecting the radiated wave;
   b. means for continuously rotating said detector means about a predetermined spin axis;
   c. means coupled to said means for rotating for generating two phase-related sinusoidal waves, each having a frequency integrally related to the frequency of rotation of said detector means;
   d. sensor means coupled to said detector means and including a phase detector for continuously detecting the phase modulation of the detected signal; and
   e. a demodulator coupled to said phase detector and to said means for generating said waves for deriving an error signal indicative of a direction between said platform and said target.

7. Apparatus as defined in claim 6 wherein said detector means consists of two antennas.

8. Apparatus as defined in claim 7 wherein each of said antennas is a circularly polarized antenna.

9. Apparatus as defined in claim 6 wherein said antenna means is a single antenna having a principal axis forming an angle with the spin axis about which said antenna is being rotated.

10. Apparatus for determining the elevation and azimuth directions from a platform to a target radiating a wave, said apparatus comprising:
    a. a pair of antennas for detecting the radiated wave;
    b. means for rotating said antennas about a predetermined axis;
    c. means for adjusting the azimuth position of said rotating antennas;
    d. means for adjusting the elevation position of said rotating antennas;
    e. a phase detector coupled to said antennas for detecting the phase difference of the waves received by each one of said antennas;
    f. means coupled to said means for rotating said antennas for generating two phase-related waves; and
    g. an azimuth signal channel including a demodulator having two input terminals, one for receiving one of said sinusoidal waves, the other terminal being coupled to said phase detector to generate an azimuth output signal.

11. Apparatus for determining elevation and azimuth directions from a platform to a target radiating a wave, said apparatus comprising:
    a. a pair of antennas for detecting said wave;
    b. a motor for rotating said antennas about an axis, said motor being fixed with respect to the platform;
    c. a sensor electronics channel for amplifying the wave received by each one of said antennas;
    d. a phase detector coupled to said sensor electronics for detecting the phase difference of the waves received by each of said antennas;
    e. means coupled to said phase detector for correlating the phase difference detected by said phase detector with the instantaneous position of said antennas with respect to a point about the spin axis thereof; and
    f. means coupled to said phase detector and to said means for correlating for deriving an elevational signal and an azimuth signal indicative of the phase difference between adjacent pairs of opposite points of antenna positions about the spin axis, thereby to derive elevation and azimuth angles between the platform and the target.

12. Apparatus for determining a direction from a platform to a target radiating a wave, said apparatus comprising:
    a. direction sensitive detector means including an antenna assembly for detecting the radiated wave;
    b. means for continuously rotating at a uniform rate said detector means including said antenna assembly about a predetermined axis of rotation, thereby to develop a modulated output signal;
    c. means coupled to said means for rotating for comparing the modulated output signal to the rotation rate of said detector means, thereby to develop an error signal representative of the direction between the platform and the target; and
    d. additional means for orienting said predetermined axis until the fundamental and odd harmonics of the modulated output signal vanish, whereupon the axis coincides with the line of sight to the target.

13. Apparatus as defined in claim 12 wherein further means is provided for generating an output indicative of the orientation of said predetermined axis when said predetermined axis coincides with the line of sight to the target.

14. Apparatus for determining the elevation and azimuth directions from a platform to a target radiating a wave, said apparatus comprising:
    a. a pair of antennas for detecting the radiated wave;
    b. means for rotating said antennas about a predetermined axis;
    c. means for adjusting the azimuth position of said rotating antennas;
    d. means for adjusting the elevation position of said rotating antennas;
    e. a phase detector coupled to said antennas for detecting the phase difference of the waves received by each one of said antennas;
    f. means coupled to said means for rotating said antennas for generating two phase-related sinusoidal waves, each having a frequency integrally related to that of the frequency of rotation of said antennas;
    g. an azimuth signal channel including a demodulator having two input terminals, one for receiving said phase difference and the other one for receiving one of said sinusoidal waves to generate an azimuth output signal;
    h. an elevation signal channel including a demodulator having two input terminals, one for receiving the other one of said sinusoidal waves and the other one for receiving said phase difference for generating an elevation output signal;

i. means coupled to said means for adjusting said antennas in the azimuth and elevation directions and responsive to said azimuth and elevation output signals for pointing said predetermined axis in the direction of the target; and j. encoding means coupled to said antenna adjusting means for deriving azimuth and elevation angles representative of the adjusted position of said predetermined axis.

15. The method of determining the elevation and azimuth directions from a platform to a target radiating a wave by means of a pair of detectors of the radiated wave, said method comprising the steps of:

a. continuously rotating the pair of detectors about a predetermined axis;

b. detecting the phase difference between each of the signals received by each detector to generate periodic variations of phase;

c. utilizing the magnitude and sense of the periodic phase variation correlated to the instantaneous position of the pair of detectors about the predetermined axis to derive the azimuth and elevation angles; and d. adjusting the direction of the predetermined axis until the fundamental component and the odd harmonics of the periodic variation of the phase vanish, whereupon the predetermined axis points toward the target.

16. Apparatus for determining a direction from a platform to a target radiating a wave, said apparatus comprising:

a. direction sensitive detector means including an antenna assembly for detecting the radiated wave, and developing output signals;

b. means for rotating said detector means including said antenna assembly about a predetermined axis of rotation;

c. means for comparing to each other the output signals obtained from said detector means; and d. means coupled to said means for rotating, for correlating said output signals at each of a plurality of pairs of points diametrically opposite to each other with respect to said predetermined axis to provide a set of difference signals for deriving an error signal indicative of the direction between the platform and the target.

17. Apparatus as defined in claim 16 wherein additional means is provided for orienting said predetermined axis until said difference signals become a minimum throughout a period of rotation of said detector means, whereupon the axis coincides with the line-of-sight to the target.

18. Apparatus as defined in claim 17 wherein further means is provided for deriving an output indicative of the orientation of said predetermined axis when said predetermined axis coincides with the line of sight to the target.

* * * * *